United States Patent [19]
Hamada et al.

[11] Patent Number: 5,366,211
[45] Date of Patent: Nov. 22, 1994

[54] ELASTIC MOUNT HAVING FLUID CHAMBER PARTIALLY DEFINED BY OSCILLATING PLATE ACTUATED BY ELECTROSTRICTIVE/MAGNETOSTRICTIVE ELEMENT

[75] Inventors: Masaaki Hamada; Yumi Sekiguchi, both of Komaki, Japan

[73] Assignee: Tokai Rubber Industries, Ltd., Japan

[21] Appl. No.: 220,015

[22] Filed: Mar. 30, 1994

Related U.S. Application Data

[63] Continuation of Ser. No. 989,516, Dec. 11, 1992.

[30] Foreign Application Priority Data

Dec. 24, 1991 [JP] Japan ................... 3-356936

[51] Int. Cl.⁵ .............................................. F16M 1/00
[52] U.S. Cl. ........................ 267/140.14; 267/140.15
[58] Field of Search ................... 188/267; 267/140.14, 267/140.15, 219, 35; 248/562, 636, 638; 180/300, 312

[56] References Cited

U.S. PATENT DOCUMENTS

| | | | |
|---|---|---|---|
| 4,650,170 | 3/1987 | Fukushima | 267/140.14 |
| 4,793,599 | 12/1988 | Ishioka | 267/140.14 |
| 5,116,029 | 5/1992 | Gennesseaux | 267/219 |
| 5,126,618 | 6/1992 | Takahashi et al. | 310/346 |
| 5,238,232 | 8/1993 | Kobayashi et al. | 267/140.14 |
| 5,277,409 | 1/1993 | Goto et al. | 267/219 |
| 5,297,781 | 3/1993 | Gennesseaux | 267/140.15 |

FOREIGN PATENT DOCUMENTS

| | | |
|---|---|---|
| 464599 | 1/1992 | European Pat. Off. . |
| 511907 | 11/1992 | European Pat. Off. ....... 267/140.14 |
| 60-8540 | 1/1985 | Japan . |
| 2-42228 | 2/1990 | Japan . |
| 4-145241 | 5/1992 | Japan ............................ 267/140.14 |

Primary Examiner—Robert J. Oberleitner
Assistant Examiner—Chris Schwartz
Attorney, Agent, or Firm—Parkhurst, Wendel & Rossi

[57] ABSTRACT

A fluid-filled elastic mount wherein an elastic body elastically connecting a first and a second support partially defines a fluid chamber filled with a non-compressible fluid. The elastic mount further includes an oscillating plate which partially defines the fluid chamber and which is supported by the second support such that the oscillating plate is displaceable relative to the second support, and an electrostrictive/magnetostrictive element for oscillating the oscillating plate to thereby change a pressure of the fluid in the fluid chamber. The second support has a small-diameter cylindrical portion to which the elastic body is secured, and a large-diameter cylindrical portion in which the oscillating plate having a large surface area is accommodated. The electrostrictive/magnetostrictive element is interposed between the oscillating plate and a support member fixed to the second support.

10 Claims, 2 Drawing Sheets

ELASTIC MOUNT HAVING FLUID CHAMBER PARTIALLY DEFINED BY OSCILLATING PLATE ACTUATED BY ELECTROSTRICTIVE/MAGNETOSTRICTIVE ELEMENT

This application is a continuation of application Ser. No. 989,516 filed Dec. 11, 1992.

BACKGROUND OF THE INVENTION

1. FIELD OF THE INVENTION

The present invention relates generally to a fluid-filled elastic mount used as a vibration damper such as an automobile engine mount, which has a fluid chamber filled with a non-compressible fluid, and more particularly to such a fluid-filled elastic mount wherein the pressure of the fluid in the fluid chamber is regulated by utilizing a force generated by an electrostrictive/magnetostrictive element, to enable the engine mount to exhibit different damping characteristics depending upon the type of the vibrations received.

2. DISCUSSION OF THE PRIOR ART

As a vibration damper for flexibly connecting two members in a vibration system or mounting one of the two members on the other member in a vibration damping fashion, there is known an elastic mount interposed between the two members of the vibration system. The elastic mount has an elastic body interposed between and elastically connecting a first and a second support which are respectively fixed to one and the other of the two members of the vibration system. This type of elastic mount may be used as an engine mount for a motor vehicle, for example.

Recently, there have been proposed various types of fluid-filled elastic mounts adapted to exhibit sophisticated damping characteristics, wherein the elastic body which elastically connects the first and second supports partially defines a fluid chamber filled with a non-compressible fluid. The fluid chamber is also partially defined by an oscillating plate, which is oscillated or displaced to change the fluid pressure in the fluid chamber depending upon the type of the input vibrations received, so that the specific vibrations can be suitably damped or isolated.

An example of such a fluid-filled elastic mount is disclosed in JP-A-60-8540, wherein the oscillating plate is actuated or oscillated by an electromagnetic force produced upon energization of a solenoid coil, for example. However, such an electromagnetic force is found unsatisfactory to provide a sufficiently large magnitude of a force to actuate the oscillating plate. Another type of fluid-filled elastic mount is disclosed in JP-A-2-42228, wherein the oscillating plate is actuated by using an electrostrictive element made of a piezo-electric ceramic material.

While the electrostrictive element can produce a large magnitude of a force to actuate the oscillating plate, the element undergoes a considerably small amount of displacement upon energization thereof, which results in an accordingly small amount of displacement of the oscillating plate. Therefore, the fluid pressure within the fluid chamber cannot be effectively changed by oscillation of the oscillating plate, whereby the elastic mount cannot provide different damping characteristics depending upon the type of the vibrations received. Thus, the known elastic mount is practically unsatisfactory in its damping characteristics.

SUMMARY OF THE INVENTION

It is therefore an object of the present invention to provide a fluid-filled elastic mount having a fluid chamber partially defined by an oscillating plate, wherein the oscillating plate is actuated and displaced by a small amount by an electrostrictive/magnetostrictive element, to cause a sufficiently large fluid pressure change in the fluid chamber so as to provide desired vibration damping characteristics of the mount.

The above object may be attained according to the principle of the present invention, which provides a fluid-filled elastic mount comprising: a first support; a generally annular second support which is spaced apart from the first support, the second support having first portion and a second portion which are arranged in an axial direction of the mount and which define a first bore and a second bore, respectively, the first bore being smaller than the second bore, the first portion having an open axial end which is opposed to the first support in the axial direction; an elastic body which is interposed between the first and second supports for elastically connecting the first and second supports and which partially defines a fluid chamber filled with a non-compressible fluid, the elastic body being secured at one end to the first support and at the other end to the open axial end of the first portion of the second support; an oscillating plate which is supported by the second portion of the second support to close the second bore and partially define the fluid chamber, the oscillating plate being displaceable relative to the second support, the oscillating plate having a surface area which is larger than an area of the first bore of the first portion of the second support; a support member fixed to the second support such that the support member is disposed on one of opposite sides of the oscillating plate remote from the fluid chamber; and an electrostrictive/magnetostrictive element disposed between the oscillating plate and the support member, for oscillating the oscillating plate to thereby change a pressure of the fluid in the fluid chamber, the electrostrictive/magnetostrictive element expanding and contracting due to a strain produced therein when an electric or magnetic field is applied to the element.

In the fluid-filled elastic mount of the present invention constructed as described above, the surface area of the oscillating plate is larger than the effective piston area of the elastic mount which is associated with a fluid pressure change in the fluid chamber caused by a vibrational load applied to the mount. Accordingly, the fluid pressure in the fluid chamber can be effectively changed by oscillation of the oscillating plate even if the amount of displacement of the plate or that of the electrostrictive/ magnetostrictive element is relatively small.

Thus, the fluid pressure in the fluid chamber can be effectively and suitably controlled upon application of the vibrational load, even with the electrostrictive/ magnetostrictive element whose amount of displacement is small. Accordingly, the present elastic mount provides optimum damping characteristics depending upon the type of vibration received, making use of some advantages of the electrostrictive/magnetostrictive element, such as a high response speed, and a large magnitude of a force generated by the element to actuate the oscillating plate.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
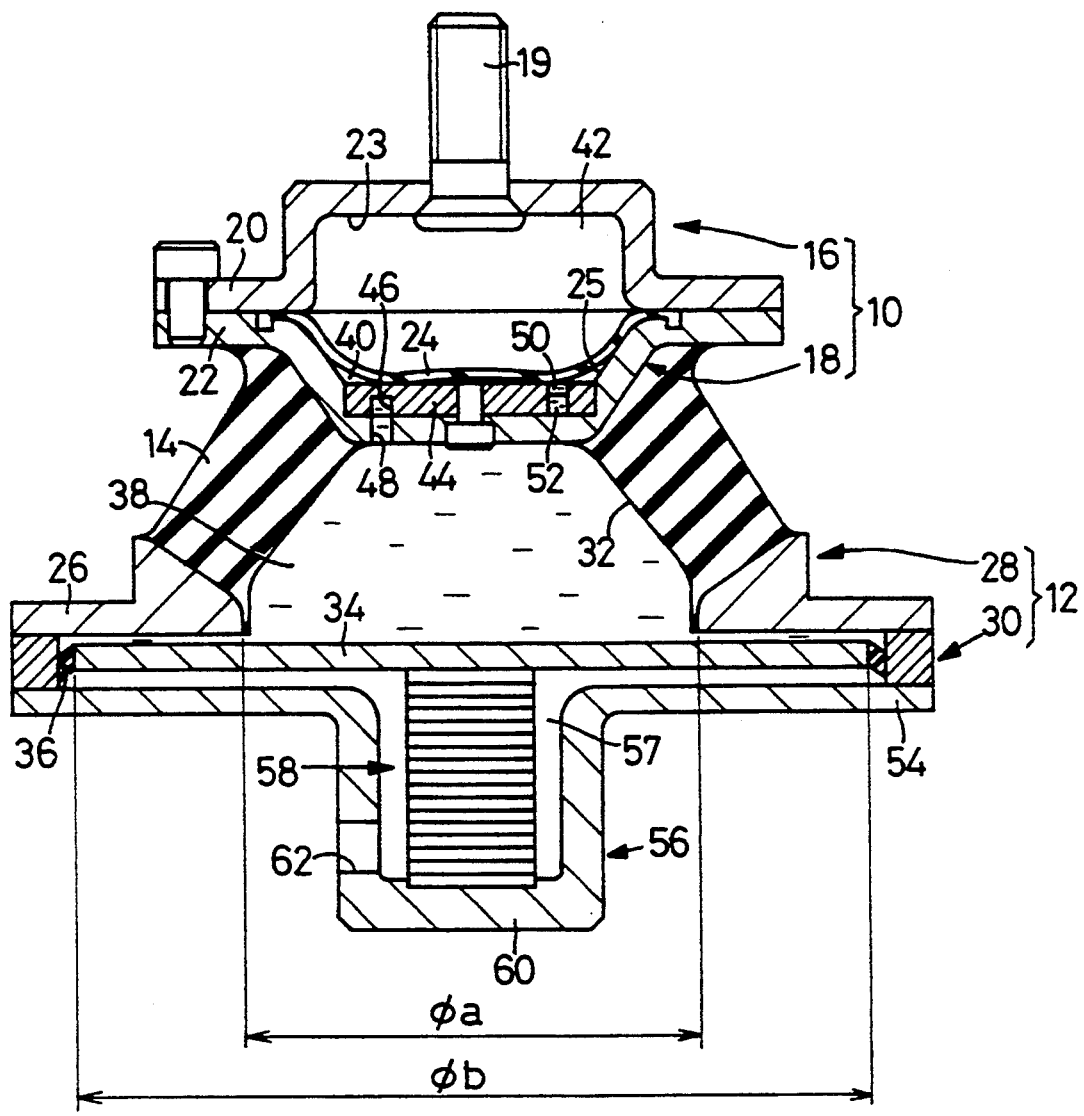
FIG. 1 is an elevational view in axial cross section of one embodiment of a fluid-filled elastic mount of this invention in the form of an engine mount for a motor vehicle.

Referring first to FIG. 1 showing a fluid-filled elastic engine mount for a motor vehicle, reference numerals 10 and 12 denote a first and a second support which are made of metals and are spaced apart from each other by a suitable distance in a load receiving direction in which the engine mount receives input vibrations. These two supports 10, 12 are elastically connected to each other by an elastic body 14 interposed therebetween. The engine mount is used to mount a power unit (including an engine) on the body of the vehicle, in a vibration damping fashion, such that the first and second supports 10, 12 are fixed to one and the other of the power unit and the vehicle body.

The first support 10 consists of an upper member 16 and a lower member 18 which are generally hat-shaped and have respective outward flanges 20, 22. The upper member 16 has a cylindrical portion defining a cylindrical recess 23, and the outward flange 20 extends radially outwardly from the open end of the cylindrical portion. The lower member 18 has a frusto-conical portion defining a frusto-conical recess 25, and the outward flange 22 extends radially outwardly from the open end of the frusto-conical portion. The upper and lower members 16, 18 are butted together at the outward flanges 20, 22 such that the cylindrical and frusto-conical recesses 23, 25 cooperate to define an enclosed space. The two members 16, 18 are bolted together to form the first support 10. A fixing bolt 19 is secured to a bottom wall portion of the upper member 16 to protrude axially outwardly of the mount. The first support 10 is fixed to the power unit or the vehicle body by the fixing bolt 19.

Within the enclosed space 23, 25 of the first support 10, there is disposed a generally frusto-conical flexible diaphragm 24. This diaphragm 24 is fixed with its peripheral portion being gripped by and between the opposed surfaces of the outward flanges 20, 22 of the upper and lower members 16, 18. The enclosed space 23, 25 is divided by the flexible diaphragm 24 into two fluid-tight sections corresponding to the two recesses 23, 25.

On the other hand, the second support 12 is a generally annular member having a relatively large wall thickness. The second support 12 has a sleeve 28 having an outward flange 26 which extends radially outwards from one of opposite axial ends thereof, and a ring 30 which is fixed to the outer peripheral portion of the outward flange 26 of the sleeve 28 by bolts (not shown), for example. The ring 30 protrudes from the outward flange 26 in the axial direction away from the elastic body 14. Thus, the second support 12 consists of a small-diameter and a large-diameter portion having two different inside diameters and corresponding to the sleeve 28 and the ring 30, respectively, and an axially intermediate stepped portion interposed therebetween.

The second support 12 is spaced by a suitable distance from the first support 10, in the axial direction which is parallel to the load receiving direction, such that the sleeve 28 is opposed to the lower member 18. The elastic body 14 is interposed between the lower member 18 and the sleeve 28 to elastically connect the first and second supports 10, 12 to each other. This elastic body 14 has a generally frusto-conical shape and a generally frusto-conical bore, and is bonded at its small end to the frusto-conical outer surface of the lower member 18 of the first support 10, and at its large end to the axial end face (remote from the outward flange 26) of the sleeve 28 of the second support 12. Thus, there is prepared an intermediate product consisting of the sleeve 28 of the second support 12, the lower member 18 of the first support 10, and the elastic body 14 formed therebetween.

In the intermediate product 10, 12, 14, the frusto-conical bore of the elastic body 14 is closed at its small end by the bottom wall of the lower member 18. Thus, there is formed a frusto-conical recess 32 which is open at its large end to the bore of the second support 12.

Within the bore of the ring 30 of the second support 12 communicating with the frusto-conical recess 32, there is disposed an oscillating plate 34 in the form of a circular disk, such that the oscillating plate 34 is located at the open end of the recess 32. This oscillating plate 34 is flexibly supported by the ring 30 of the second support 12, through an annular rubber support 36. Thus, the oscillating plate 34 is attached to the second support 12 such that the plate 34 is displaceable relative to the support 12 based on elastic deformation of the rubber support 36.

The oscillating plate 34 has an outside diameter $\phi b$ which is larger than the inside diameter $\phi a$ of the small-diameter portion (i.e., the sleeve 28) of the second support 12 to which the elastic body 14 is secured. In this particular embodiment, the outside diameter $\phi b$ of the oscillating plate 34 is set to be about twice as large as the inside diameter $\phi a$ of the sleeve 28 of the second support 12.

With the oscillating plate 34 flexibly supported by the second support 12 via the rubber support 36, the frusto-conical recess 32 is fluid-tightly enclosed to form a fluid chamber in the form of a pressure-receiving chamber 38 filled with a suitable non-compressible fluid, preferably water, alkylene glycol, polyalkylene glycol and silicone oil.

Since the pressure-receiving chamber 38 is partially defined by the wall of the elastic body 14, the pressure of the fluid in the chamber 38 changes due to elastic deformation of the elastic body 14 upon application of a vibrational load between the first and second support 10, 12 in the load receiving direction, i.e., in the axial direction of the engine mount.

The pressure-receiving chamber 38 communicates, through an orifice passage 52, with an equilibrium chamber 40 also filled with the non-compressible fluid. Namely, the equilibrium chamber 40 is defined by the flexible diaphragm 24 and a disk 44 accommodated in the frusto-conical recess 25 of the lower member 18 of the first support 10. The disk 44 is bolted to the bottom wall of the lower member 18, which functions as a partition which separates the pressure-receiving and equilibrium chambers 38, 40. The disk 44 has a circumferential groove 46 in the surface which contacts the bottom wall of the lower member 18. The circumferential groove 46 communicates with the pressure-receiving chamber 38 through a communication hole 48 formed through the bottom wall of the lower member 18, and with the equilibrium chamber 40 through a communication hole 50 formed through the disk 44. Thus, the groove 46 cooperates with the communication holes 48, 50 to define the orifice passage 52 for fluid communication between the two fluid chambers 38, 40.

The flexible diaphragm 24 elastically yields to permit a volumetric change of the equilibrium chamber 40 when the fluid flows into and from the equilibrium chamber 40 upon application of a vibrational load to the engine mount. Thus, the flexible diaphragm 24 absorbs a pressure change in the equilibrium chamber 40. The flexible diaphragm 24 and the upper member 16 of the first support 10 define an air chamber 42, which permits elastic deformation or displacement of the flexible diaphragm 24.

When a pressure change of the fluid occurs in the pressure-receiving chamber 38 due to the input vibration, the fluid is forced to flow through the orifice passage 52, between the two fluid chambers 38, 40, whereby the input vibration is damped based on the resonance of the fluid flowing through the orifice passage 52, as well known in the art. The orifice passage 52 is tuned, that is, the length and cross sectional area of the passage 52 are determined, so as to effectively damp low-frequency vibrations such as shake, based on the resonance of the fluid flowing through the orifice passage 52.

The engine mount further includes a support member 56 which is fixed to the lower end of the ring 30 of the second support 12. This support member 56 is a cylindrical metallic member having an outward flange 54 at its one axial end and a bottom wall 60 at the other axial end. The support member 56 is superposed at an outer peripheral portion of the outward flange 54 on the lower open end of the ring 30, and fixed to the ring 30 by bolts (not shown) or other fixing means. Thus, the support member 56 is disposed on the side of the oscillating plate 34 remote from the pressure-receiving chamber 38 with a suitable spacing between the member 56 and plate 34. The support member 56 cooperates with the oscillating member 34, rubber support 36 and ring 30 to define an air chamber 57.

Within the air chamber 57, there is accommodated an electrostrictive element 58 which is formed of a piezoelectric ceramic material comprising lead (Pb), zirconium (Zr) and titanium (Ti) as major components, for example, as known in the art. The electrostrictive element 58 is interposed between the bottom wall 60 of the support member 56 and a radially inner portion of the oscillating plate 34. Preferably, multiple layers of the piezoelectric ceramic are laminated on each other in the load-receiving direction, i.e., the axial direction of the engine mount, to form the electrostrictive element 58 which expands and contracts in its longitudinal direction due to the longitudinal mode of electrostrictive or inverse piezoelectric effect so as to generate a large magnitude of a force to oscillate the oscillating plate 34. Namely, the electrostrictive element 58 is displaced in the direction in which the piezo-ceramic layers are laminated, due to the longitudinal strain generated therein, when an electric current is applied to the element 58 through a conductor wire extending through a hole 62 formed through the support member 56.

The electrostrictive element 58 is fixedly mounted in the engine mount such that one of its longitudinally opposite end faces is in contact with the bottom wall 60 of the support member 56 while the other longitudinal end face is in contact with the oscillating plate 34.

The electrostrictive element 58 thus mounted is in pressed contact with the lower surface of the oscillating plate 34 to push the plate 34 upwards, whereby the electrostrictive element 58 is subject to preliminary compression in the axial direction based on the elastic force of the rubber support 36. Generally, the tensile strength of a lamination type electrostrictive element is far smaller than (e.g., about 1/180 times as small as) the compressive strength thereof. With the electrostrictive element 58 being subject to the preliminary compression, therefore, the tensile load received by the element 58 can be advantageously reduced, thereby assuring improved durability and operating reliability of the electrostrictive element 58.

In operation of the engine mount constructed as described above, the electrostrictive element 58 is energized by a controlled alternating voltage which causes the longitudinal strain (or vibration) to occur in the element 58 in the axial direction in which the piezo-ceramic layers are laminated, at an interval corresponding to the frequency of the alternating voltage applied to the element 58, due to the inverse piezoelectric effect of the element 58. As a result, the electrostrictive element 58 is displaced or deformed in its longitudinal direction, i.e., in the axial direction of the engine mount, whereby the oscillating plate 34 fixed to the element 58 is oscillated in the axial direction so as to change the volume of the pressure-receiving chamber 38. The air chamber 57 permits the oscillation of the element 58.

The alternating voltage to be applied to the electrostrictive element 58 is controlled in terms of its amplitude, frequency, phase and other factors, depending upon the operating conditions of the power unit (engine) and the condition under which the vibration is transmitted from the power unit to the vehicle body, so that the oscillating plate 34 is optimally oscillated to deal with a fluid pressure change in the pressure-receiving chamber 38 induced by the input vibrational load. In this manner, the fluid pressure in the pressure-receiving chamber 38 can be suitably regulated by oscillation of the oscillating plate 34 so that the engine mount exhibits different damping characteristics as desired, depending upon the type of vibration received.

Described in detail, when the engine mount receives low-frequency vibration such as shake or bounce, the oscillating plate 34 is oscillated in the same phase as the input vibration, so as to positively cause a fluid pressure change in the pressure-receiving chamber 38, for increasing the amount of the fluid which flows through the orifice passage 52, and thereby improving the damping effect based on the fluid flow through the orifice passage 52. When the engine mount receives medium- to high-frequency vibration such as booming noise, the phase of oscillation of the oscillating plate 34 is reversed with respect to that of the input vibration, to thereby absorb the fluid pressure change in the pressure-receiving chamber 38 or reduce the amount of the fluid pressure change, so that the engine mount exhibits an effectively reduced dynamic spring constant with respect to the medium- to high-frequency vibration.

In the present engine mount as described above, the outside diameter $\phi b$ of the oscillating plate 34 is set to be larger than the inside diameter $\phi a$ of sleeve 28 of the second support 12 to which the elastic body 14 is secured. This means that the oscillating plate 34 has a sufficiently large surface area, which is much greater than an effective piston area of the engine mount which is associated with a fluid pressure change in the pressure-receiving chamber 38 caused by the vibration received. Therefore, the fluid pressure in the pressure-receiving chamber 38 can be effectively regulated, even if the amount of displacement of the oscillating plate 34 is relatively small, in comparison with the amount of displacement of the first support 10 relative to the second support 12 upon application of the vibration to the mount.

The above-indicated effective piston area of the engine mount should be interpreted as an area of reflection in the plane perpendicular to the load receiving direction, of a part of the inner wall of the pressure-receiving chamber 38 provided by the first support 10 and elastic body 14, which part causes a fluid pressure change in the chamber 38 when the first support 10 and elastic body 14 are displaced relative to the second support 12 in the load receiving direction upon application of the vibration. This effective piston area is smaller than the maximum inside diameter of the elastic body 14.

The oscillating plate 34 having such a large surface area ensures a sufficiently large amount of the fluid pressure change in the pressure-receiving chamber 38 due to displacement of the plate 34 relative to the first support 10 and elastic body 14, even if the amount of the displacement of the plate 34 or electrostrictive element 58 is relatively small. Thus, the above-described arrangement effectively alleviates or eliminates the conventional problem of insufficiency of the fluid pressure change in the pressure-receiving chamber resulting from the inherently small displacement of the electrostrictive element. Further, the electrostrictive element 58 can be easily controlled assuring a high response speed, and provides a large magnitude of a force to actuate the oscillating plate 34. Accordingly, the present elastic mount exhibits optimum damping characteristics depending upon the type of the vibration received.

In the engine mount of the instant embodiment, the diameter $\phi b$ of the oscillating plate 34 is about twice as large as the diameter of the above-indicated effective piston area. Therefore, the displacement of the oscillating plate 34 causes about four times as large an amount of volume change of the pressure-receiving chamber 38 as the displacement of the first support 10. For instance, the engine mount, which uses the electrostrictive element 58 adapted to generate the maximum longitudinal strain of $\pm 0.05$ mm, is able to suitably absorb the fluid pressure change in the pressure-received chamber 38 caused by the input vibration having an amplitude of up to $\pm 0.2$ mm.

Figure 2:
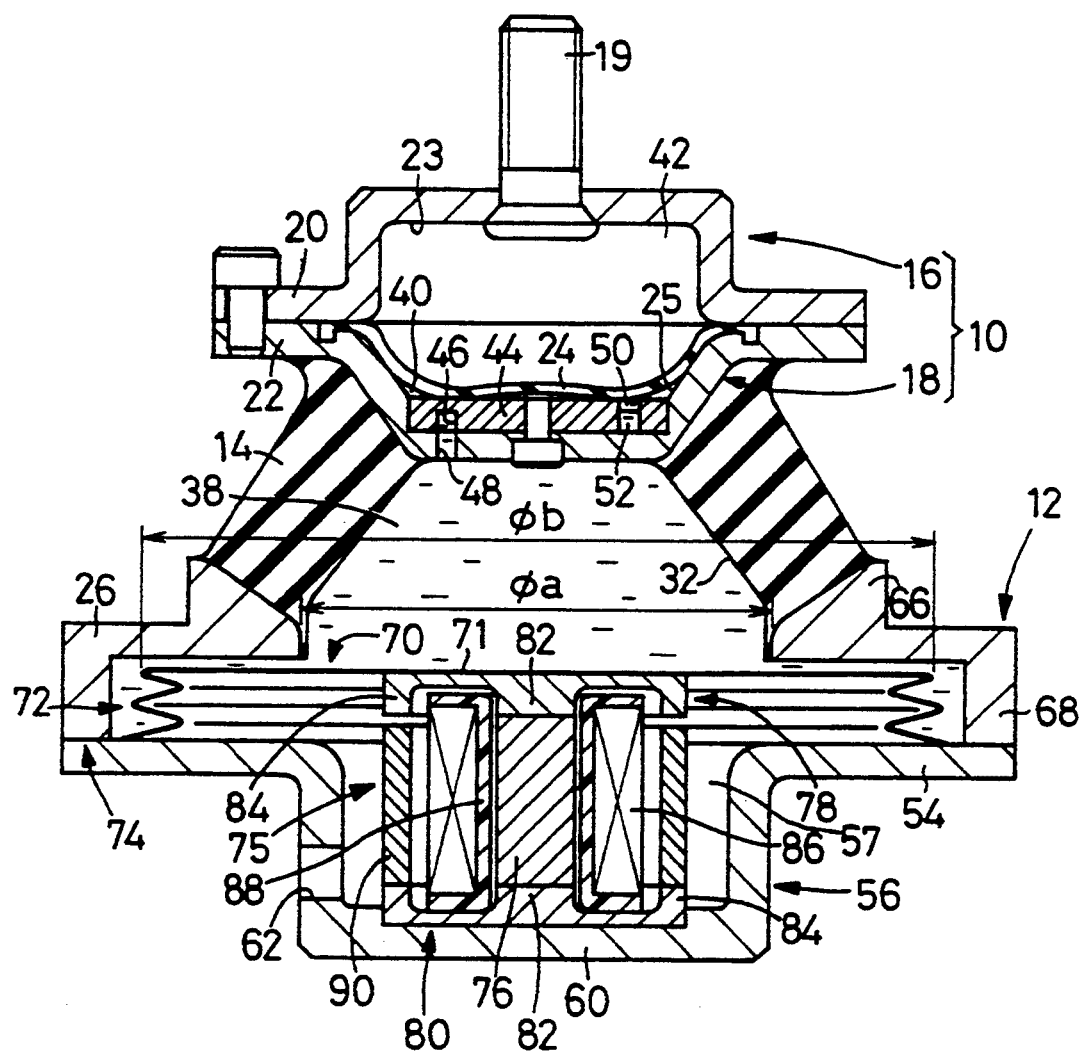
FIG. 2 is an elevational view in axial cross section of another embodiment of the fluid-filled elastic mount of this invention in the form of an engine mount for a motor vehicle.

Referring next to FIG. 2, there will be described another embodiment of this invention also in the form of a vehicle engine mount. In the interest of brevity and simplification, the same reference numerals as used in the first embodiment will be used in the second embodiment to identify the corresponding components, and redundant description of these components will not be provided.

In the engine mount of the instant embodiment, the second support 12 is a generally annular integral member having an axially intermediate stepped portion, and a small-diameter portion 66 and a large-diameter portion 68 corresponding to the sleeve (28) and the ring (30) used in the first embodiment.

Within the large-diameter portion 68 of the second support 12, there is provided an oscillating member 70 which consists of a metallic plate such as a steel plate. This oscillating member 70 includes a circular disk 71 having a flat circular surface, a bellows portion 72 which extends from the outer periphery of the circular disk in the axial direction toward the support member 56, and an outward flange 74 which extends radially outwards from the open axial end of the bellows portion 72.

The oscillating member 70 has an outside diameter $\phi b$ which is larger than the inside diameter $\phi a$ of the small-diameter portion 66 of the second support 12 to which the elastic body 14 is secured.

With the outward flange 74 gripped by and between the axial end face of the large-diameter portion 68 of the second support 12 and the flange 54 of the support member 56, the oscillating member 70 is held in position within the large-diameter portion 68 such that the circular disk 71 extends in a plane perpendicular to the axis of the second support 12. In this arrangement, the opening of the second support 12 is fluid-tightly closed by the oscillating member 70, whereby the pressure-receiving chamber 38 is defined by the first support 10, elastic body 14, second support 12 and oscillating member 70. On the other hand, the oscillating member 70 cooperates with the support member 56 to define the air chamber 57.

The oscillating member 70 supported by the second support 12 is allowed to be displaced in the axial direction relative to the second support 12, based on expansion and contraction of the bellows portion 72. In this connection, the circular disk 71 of the oscillating member 70 is desirably prevented from being curved or elastically deformed. If the oscillating member 70 is unsatisfactory in its rigidity due to the material used, for example, an appropriate reinforcing member may be used as needed along with the member 70.

Within the air chamber 57 between the oscillating member 70 and the support member 56, there is accommodated an electromagnetic drive device 75 for actuating or oscillating the oscillating member 70. The electromagnetic drive device 75 includes a magnetostrictive element 76 in the form of a circular rod, and an upper and a lower yoke member 78, 80 made of an iron or other ferromagnetic material, which are disposed in contact with the axially opposite end faces of the element 76. Each of the upper and lower yoke members 78, 80 has a substantially disk-like shape, and includes as integral parts a circular protrusion 82 and an annular protrusion 84 formed respectively on a central portion and an outer peripheral portion of one major surface of the member 78, 80. The magnetostrictive element 76 and upper and lower yoke members 78, 80 are-superposed on each other such that the axially opposite end faces of the element 76 are held in contact with the corresponding end faces of the circular protrusions 82 of the yoke members 78, 80.

Radially outwardly of the magnetostrictive element 76 and between the upper and lower yoke members 78, 80, there is disposed a coil 86 which is wound around the element 76. The coil 86 is fitted in a bobbin 88 made of a non-magnetic material such as resin or aluminum. The bobbin 88 is secured to the lower yoke member 80 by an adhesive or bolt, for example, such that the bobbin 88 is spaced with a suitable clearance away from the outer circumferential surface of the magnetostrictive element 76. There is also a suitable clearance between the bobbin 88 and the upper yoke member 78. This arrangement permits the magnetostrictive element 76 to be displaced in the axial direction without interfering with the coil 86 or bobbin 88, when the element 76 is subject to a magnetic field as described below.

Radially outwardly of the coil 86, there is provided a cylindrical permanent magnet 90 having opposite magnetic poles or pole faces at its axially opposite ends. The permanent magnet 90 is interposed between the opposed end faces of the annular protrusions 84, 84 of the upper and lower yoke members 78, 80 such that the magnet 90 surrounds the magnetostrictive element 76 and coil 86. The permanent magnet 90 is secured at its lower pole face to the end face of the annular protrusion 84 of the lower yoke member 80, and is opposed at its upper pole face to the end face of the annular protrusion 84 of the upper yoke member 78 with a suitable clearance therebetween. This arrangement permits the magnetostrictive element 76 to be displaced in the axial direction without interfering with the magnet 90.

In the thus constructed electromagnetic drive device 75 including the magnetostrictive element 76, upper and lower yoke members 78, 80, coil 86 and permanent magnet 90, the magnetostrictive element 76 is subject to a magnetic field produced upon energization of the coil 86, whereby the element 76 is caused to expand and contract in the axial direction thereof. While the magnetostrictive element 76 may be formed of a suitable known ferromagnetic material, such as alfer, it is preferable to employ a ferromagnetic material including a rare earth element such as terbium (Tb), to assure a sufficiently large amount of displacement of the element 76 due to its magnetostriction.

With the upper and lower yoke members 78, 80 magnetically connected to the opposite pole faces of the permanent magnet 90, the two yoke members 78, 80 and the magnetostrictive element 76 cooperate with the magnet 90 to provide a closed magnetic circuit or path. Accordingly, the permanent magnet 90 exerts a magnetic force on the magnetostrictive element 76 with high efficiency, whereby the element 76 is subject to a bias magnetic field. Accordingly, the magnetostrictive element 76, which is thus subject to a bias magnetic field, is given an improved magnetostrictive sensitivity, assuring sufficiently large positive and negative expansions or displacements due to an alternate magnetic field applied to the element 76.

The electromagnetic drive device 75 as described above is interposed between the oscillating member 70 and the bottom wall 60 of the support member 56, such that the upper and lower yoke members 78, 80 are fixedly held in contact with the member 70 and the bottom wall 60, respectively. With the drive device 75 thus mounted in position, the upper yoke member 78 is in pressed contact with the lower surface of the oscillating member 70 to push the member 70 upwards, whereby the magnetostrictive element 76 is subject to a preliminary compression in the axial direction thereof due to an elastic force of the bellows portion 72. With the preliminary compression thus applied, the magnetostrictive element 76 is given an improved magnetostrictive sensitivity assuring a sufficiently large amount of displacement.

In operation of the engine mount constructed as described above, the coil 86 is energized by a controlled alternating current, whereby the magnetostrictive element 76 is subject to a magnetic field which is produced by the coil 86 and which is substantially proportional to the amount of electric current applied to the coil 86. The magnetic field thus produced causes the magnetostrictive element 76 to expand and contract in the axial direction, and eventually oscillate or actuate the oscillating member 70 to suitably regulate the fluid pressure in the pressure-receiving chamber 38. Namely, the fluid pressure in the chamber 38 can be suitably regulated by oscillating the oscillating member 70 while suitably controlling the amount of electric current applied to the coil 86, to thereby enable the present engine mount to exhibit desired damping characteristics depending upon the type of the vibration received.

In the present engine mount, the surface area of the circular disk 71 of the oscillating member 70 is much larger than the effective piston area of the engine mount which is associated with a fluid pressure change in the pressure-receiving chamber 38 due to the vibrations applied to the mount. Therefore, as in the first embodiment, a sufficiently large fluid pressure change takes place in the pressure-receiving chamber 38 due to the axial displacement of the oscillating member 70, even if the amount of displacement of the magnetostrictive element 76 is relatively small.

The above arrangement effectively alleviates or eliminates the problem of inherently small displacement of the magnetostrictive element, while assuring various advantages of the magnetostrictive element, such as a high response speed, easy control thereof and a large magnitude of a force to actuate the oscillating plate. Accordingly, the present engine mount exhibits different damping characteristics depending upon the type of the vibration received, by suitably controlling the fluid pressure in the pressure-receiving chamber 38, so as to sufficiently and stably provide an optimum damping effect.

Further, the present engine mount is advantageous in significantly increased amounts of displacement of the magnetostrictive element 76 and oscillating member 70 due to the preliminary compression applied to the magnetostrictive element 76 in the axial direction (in the direction of flexural displacement thereof), and the bias magnetic field applied to the element 76 as described above.

While the present invention has been described in detail with its presently preferred embodiments with certain degrees of particularity, it is to be understood that the invention is not limited to the details of the illustrated embodiments, but may be otherwise embodied.

In the illustrated embodiments, the fluid chamber (pressure-receiving chamber 38) is held in fluid communication with the equilibrium chamber 40 through the orifice passage 52. However, the present invention is applicable to a fluid-filled elastic mount which does not have such equilibrium chamber and orifice passage.

While the electrostrictive/magnetostrictive element 58, 76 receives a compressive load in the axial direction in the illustrated embodiments, it is not necessary to apply such a compressive load to the element.

In the illustrated embodiments, the rubber support (36) or bellows portion (72) is used as means for flexibly supporting the oscillating plate such that the plate is displaceable relative to the second support. However, it is possible to use a sheet spring made of metal or FRP, for example, as the flexible support means.

The ratio of the area of the oscillating plate or member 34, 70 to the area of the small-diameter opening of the second support 12 adjacent the elastic body 14 is not limited to those of the illustrated embodiments, but may be changed as needed, in view of the amplitude of the vibration to be damped, a desired size of the elastic mount and various other factors.

While the illustrated fluid-filled elastic mounts are engine mounts for a motor vehicle, the principle of the present invention is equally applicable to other types of vehicle damping devices such as vehicle body mounts and differential gear mounts, and even to vibration dampers or elastic mounts used in various equipment or systems other than those for motor vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled elastic mount comprising:
   a first support;
   a generally annular second support which is spaced apart from said first support, said second support having a first portion and a second portion which are arranged in an axial direction of the mount and which define a first bore and a second bore, respectively, said first bore being smaller than said second bore, said first portion having an open axial end which is opposed to said first support in said axial direction;
   an elastic body which is interposed between said first and second supports for elastically connecting the first and second supports and which partially defines a fluid chamber filled with a non-compressible fluid, said elastic body being secured at one end to said first support and at the other end to said open axial end of said first portion of said second support;
   an oscillating plate which is supported by said second portion of said second support to close said second bore and partially define said fluid chamber, said oscillating plate being displaceable relative to said second support, said oscillating plate having a surface area which is larger than an area of said first bore of said first portion of said second support;
   a support member fixed to said second support such that said support member is disposed on one of opposite sides of said oscillating plate remote from said fluid chamber;
   said oscillating plate and said support member cooperating with each other to at least partially define an air chamber; and
   an electrostrictive or magnetostrictive element disposed in said air chamber between said oscillating plate and said support member, for oscillating said oscillating plate to thereby change a pressure of the fluid in said fluid chamber, upon expansion and contraction of said electrostrictive or magnetostrictive element due to a strain produced therein when an electric or magnetic field, respectively, is applied to the element, said air chamber permitting oscillation of said oscillating plate by said electrostrictive or magnetostrictive element.

2. A fluid-filled elastic mount according to claim 1, wherein said oscillating plate has an outside diameter about twice as large as an inside diameter of said first portion of said second support.

3. A fluid-filled elastic mount according to claim 1, wherein said electrostrictive or magnetostrictive element is an electrostrictive element which consists of a multiplicity of piezoelectric ceramic layers that are laminated on each other in said axial direction of the mount, said electrostrictive element being displaced in a longitudinal direction thereof parallel to the axial direction of the mount, upon application of an electric current thereto, due to a longitudinal mode of inverse piezoelectric effect of the element.

4. A fluid-filled elastic mount according to claim 3, wherein said support member is a cylindrical member having a bottom wall and an outward flange at opposite axial ends thereof, said electrostrictive element being accommodated in said cylindrical member such that longitudinally opposite end faces of the element are held in contact with said oscillating plate and said bottom wall of said cylindrical member, respectively.

5. A fluid-filled elastic mount according to claim 1, wherein said electrostrictive or magnetostrictive element is a magnetostrictive element in the form of a circular rod having opposite axial end faces, said elastic mount further comprising a first and a second yoke member which are connected to said opposite axial end faces of said magnetostrictive element, and an annular permanent magnet surrounding said magnetostrictive element and said coil, said magnetostrictive element and said first and second yoke members cooperating with said permanent magnet to define a closed magnetic circuit.

6. A fluid-filled elastic mount according to claim 5, wherein said support member is a cylindrical member having a bottom wall and an outward flange at opposite axial ends thereof, said first and second yoke members being held in contact with said oscillating plate and said bottom wall of said cylindrical member, respectively.

7. A fluid-filled elastic mount according to claim 1, wherein said electrostrictive or magnetostrictive element is preliminarily compressed in said axial direction of the mount.

8. A fluid-filled elastic mount according to claim 1, wherein said oscillating plate consists of a circular disk which is connected to said second support through an annular elastic member.

9. A fluid-filled elastic mount according to claim 1, wherein said oscillating plate has a circular disk portion, and a bellows portion which expands and contracts in said axial direction of the mount to allow axial displacement of said circular disk portion.

10. A fluid-filled elastic mount according to claim 1, wherein said fluid chamber is a pressure-receiving chamber, and further comprising a flexible diaphragm which partially defines an equilibrium chamber, and means for defining an orifice passage for fluid communication between said pressure-receiving and equilibrium chambers, said orifice passage being tuned to damp a vibrational load having a frequency within a predetermined range, based on resonance of said non-compressible fluid flowing through said orifice passage upon application of said vibrational load between said first and second supports.

* * * * *